Sept. 6, 1955 M. WERNLI 2,716,905
SELECTIVE SPEED REDUCTION GEARING
Filed Oct. 1, 1951
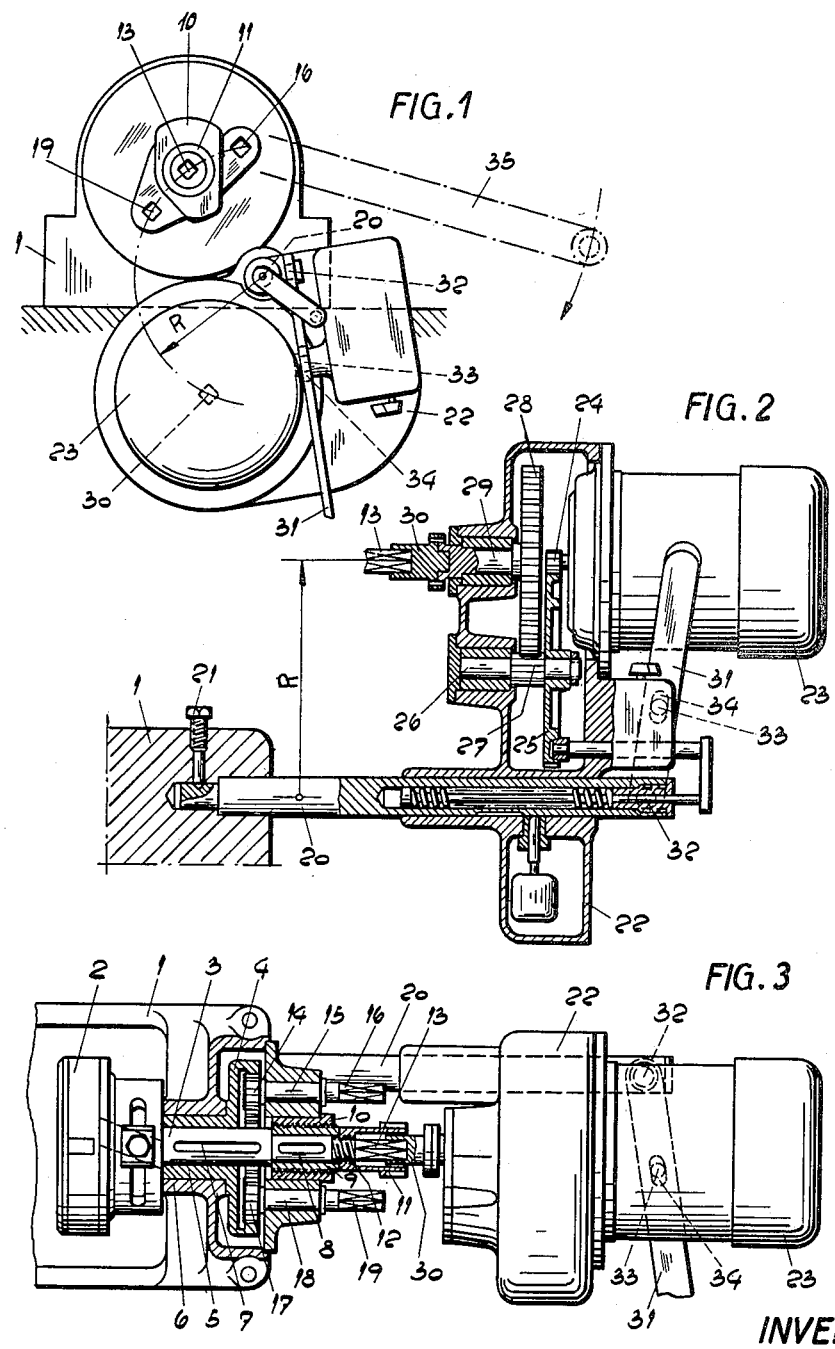
INVENTOR:
Max Wernli
By Thenderoth, Lind & Ponack
Attorneys.

United States Patent Office 2,716,905
Patented Sept. 6, 1955

2,716,905

SELECTIVE SPEED REDUCTION GEARING

Max Wernli, Schaffhausen, Switzerland, assignor to Georg Fischer Aktiengesellschaft, Schaffhausen, Switzerland Application October 1, 1951, Serial No. 249,057

Claims priority, application Switzerland October 5, 1950

5 Claims. (Cl. 74—665)

The present invention relates to an apparatus in which a screwing chuck or the like is driven by an electromotor through a speed reduction gear.

One object of the invention is to provide, in a screw thread cutting apparatus or the like, means for changing the speed ratio between said electromotor and said screwing chuck or similar apparatus without having to dismantle gearwheels of the speed reduction gear.

Another object of the invention is to provide a compact arrangement of the parts so as to ensure small overall dimensions of the apparatus.

Further objects and advantages of the invention will become apparent from the description now to follow, of an embodiment of the said invention, with reference to the accompanying drawing in which:

Fig. 1 shows the screw thread cutting apparatus in front view. The housing of the speed reduction gear is shown in its lower position in which the said gear is not coupled to the screwing chuck drive.

Fig. 2 shows at a larger scale a vertical section through the speed reduction gear with the latter in its raised position and the said gear coupled to the screwing chuck drive.

Fig. 3 shows, also at a larger scale, a partly sectional plan view of the screwing chuck drive, with the speed reduction gear coupled to the latter and in raised position.

In the drawing, 1 indicates the housing of the screwing chuck drive, 2 is the screwing chuck and 3 the screwing chuck shaft, which is rigidly coupled to the screwing chuck. 4 indicates an internally toothed gearwheel, the hub 5 of which projects towards the screwing chuck, receives the shaft 3 and is rotatably supported in an axial bore of a hub 6 of the housing 1. The shaft 3 carries longitudinal keys 7 lodged in grooves of the shaft and engaging longitudinal grooves in the bore of hub 5 in such a way that the shaft 3 is axially shiftable in the hub 5 of the internally toothed gearwheel 4. An interchangeable externally threaded bush 9 surrounds the portion 8 of the rotatable shaft 3 projecting beyond the internally toothed gear wheel 4 at the back of the screwing chuck drive housing. Bush 9 is secured against rotation on the portion 8 of the shaft 3, and its external thread engages the internal thread of a screw nut 10 serving as thread guiding nut. The screw nut 10 is cylindrically shaped at its outer circumference and is supported in a cylindrical bore of the housing 1, in which it is secured against axial and angular displacement. The threaded bush 9 is secured against axial displacement on the shaft 3 by a thread nut 11 which is screwed onto a threaded portion 12 of the said shaft. The end of the shaft 3 adjoining the threaded portion 12 is shaped as a square head 13.

The internal toothing of the gear wheel 4 is engaged by a toothed pinion 14, integral with or otherwise rigidly connected to an auxiliary shaft 15 which is rotatably supported in the housing 1. The free end of the shaft 15 projecting beyond the housing 1 is shaped as a square head 16. Opposite the toothed pinion 14 a second toothed pinion 17, which has a larger diameter than the toothed pinion 14, engages the internal toothing of gear wheel 4. The shaft 18 which carries the toothed pinion 17 is rotatably supported in the housing 1, and the free end of the shaft 18 projecting beyond the housing 1 is shaped as a square head 19.

A spindle 20 is located in a bore of the screwing chuck drive housing 1, and retained therein by means of a setting screw 21, with its axis at a definite distance from the axis of the shaft 3 which carries the screwing chuck and provides the square head 13. When the setting screw 21 is unscrewed, the spindle 20 can be removed from the housing 1 (Fig. 2). The housing 22 of the speed reduction gear is swingably mounted on the spindle 20 and carries an electromotor 23, flanged thereto. The shaft of the electromotor 23 carries a toothed pinion 24 which meshes with a large gearwheel 25 freely rotatable on a shaft 26 supported in the housing 22. The large gear-wheel 25 is coupled to a toothed pinion 27 which meshes with another large gearwheel 28 fixed to a further shaft 29 rotatably supported in the housing 22, the distance between the axes of shaft 29 and spindle 20 being equal to that between the latter and shaft 3. The free end of the shaft 29 projecting beyond the housing 22 is provided with a hollow square 30 which can be coupled to the square head 13 of the screwing chuck shaft 3 by swinging the housing 22 of the speed reduction gear upwards about the spindle 20 and thereafter axially shifting the housing 22 on the spindle 20. The radius by which the hollow square 30 swings about the axis of spindle 20, i. e. the said distance between shaft 29 and spindle 20 is indicated by R in Figs. 1 and 2. The axes of the shafts 15 and 18 of the toothed pinions 14 and 17 situated opposite each other, and providing the squares 16 and 19, are also arranged at the distance R from the axis of spindle 20, so that the hollow square 30 may be selectively engaged on any of the square heads 13 or 16 or 19.

The swinging and axial displacement of the housing 22 is effected by means of a hand lever 31 which is articulated on the spindle 20 at the point 32. A pin 33 which engages a longitudinal slot 34 of the hand lever 31 is attached to the housing 22. The articulated connection between the spindle 20 and the hand lever 31 at the point 32 is constructed to permit swinging the hand lever 31 both about the axis of spindle 20 and about an axis perpendicular thereto (Fig. 1).

After removing the spindle 20 and the speed reduction gear carried by it from the screwing chuck drive, the latter can also be operated by means of a hand crank if desired. In Fig. 1, this hand crank, indicated by dash-and-dot lines at 35, is shown mounted on the square 16 of the auxiliary shaft 15.

What I claim is:

1. Selective speed reduction gearing apparatus comprising a stationary housing, a spindle carried by said housing, a swingable gear housing articulated on said spindle carried by said stationary housing, a drive shaft rotatably supported in said gear housing, a driven shaft and at least one auxiliary driven shaft each rotatably supported in said stationary housing, said drive, driven and auxiliary driven shafts being supported in their respective housings with their axes at equal distances from and spaced along a circle about the axis of said spindle carrying said gear housing on said stationary housing whereby said drive shaft is enabled to be aligned with any of said driven and auxiliary driven shafts by movement of said gear housing on said spindle, coupling means on each of said drive, driven and auxiliary driven shafts for alternative coupling of said drive shaft with either of said driven or auxiliary driven shafts when aligned therewith, an electromotor mounted on said gear housing, reduction gear means between said electromotor and said drive shaft, an internally toothed gearwheel angularly coupled to said driven shaft, a toothed pinion on said auxiliary driven shaft, said gear wheel and said pinion being mounted in said stationary housing said pinion meshing with said internally toothed gearwheel.

2. Selective speed reduction gearing apparatus comprising a stationary housing, a spindle carried by said stationary housing, a gear housing supported by said spindle in swingable and axially shiftable relation to said stationary housing, a drive shaft rotatably supported in said gear housing and axially located therein, a driven shaft and at least one auxiliary driven shaft each rotatably supported in said stationary housing, said drive, driven and auxiliary driven shafts being supported in their respective housings with their axes at equal distances from and spaced along a circle about the axis of said spindle, whereby said drive shaft is enabled to be axially aligned with any of said driven and auxiliary driven shafts by circular movement of said gear housing on said spindle, axially engageable coupling means on each of said drive, driven and auxiliary driven shafts for alternative coupling of said drive shaft, by axial shifting thereof, with either of said driven or auxiliary driven shafts when aligned therewith, an electromotor mounted on said gear housing, reduction gear means between said electromotor and said drive shaft, an internally toothed gearwheel angularly coupled to said driven shaft, a toothed pinion on said auxiliary driven shaft, said gear wheel and said pinion being mounted in said stationary housing said pinion meshing with said internally toothed gearwheel.

3. Selective speed reduction gearing apparatus comprising a stationary housing, a spindle carried by said housing, a swingable gear housing articulated on said spindle, a drive shaft rotatably supported in said gear housing, a driven shaft supported in said stationary housing for rotation and longitudinal displacement therein, an externally threaded bush removably mounted on said driven shaft in angularly and axially fixed relation therewith, an internally threaded nut removably mounted in said stationary housing in angularly and axially fixed relation therewith, said externally threaded bush and said internally threaded nut engaging each other for helical guiding of said bush and driven shaft, at least one auxiliary driven shaft rotatably supported in said stationary housing, said drive, driven and auxiliary driven shafts being supported in their respective housings at equal distances from and spaced along a circle about the axis of said spindle carrying said gear housing on said stationary housing whereby said drive shaft is enabled to be aligned with any of said driven and auxiliary driven shafts by movement of said gear housing on said spindle, coupling means on each of said drive, driven and auxiliary driven shafts for alternative coupling of said drive shaft with either of said driven or auxiliary driven shafts when aligned therewith, an electromotor mounted on said gear housing, reduction gear means between said electromotor and said drive shaft, an internally toothed gearwheel angularly coupled to said driven shaft, a toothed pinion on said auxiliary driven shaft, said gear wheel and said pinion being mounted in said stationary housing said pinion meshing with said internally toothed gearwheel.

4. Selective speed reduction gearing apparatus comprising a stationary housing, a spindle carried by said stationary housing, a gear housing supported by said spindle in swingable and axially shiftable relation to said stationary housing, a lever articulated on said spindle and on said gear housing, a drive shaft rotatably supported in said gear housing and axially located therein, a driven shaft and at least one auxiliary driven shaft each rotatably supported in said stationary housing, the said drive, driven and auxiliary driven shafts being supported in their respective housings with their axes at equal distances from and spaced along a circle about the axis of said spindle, whereby said drive shaft is enabled to be axially aligned with any of said driven and auxiliary driven shafts, axially engageable coupling means on each of said drive, driven and auxiliary driven shafts for alternative coupling of said drive shaft, by axial shifting thereof, with either of said driven or auxiliary driven shafts when aligned therewith, an electromotor mounted on said gear housing, reduction gear means between said electromotor and said drive shaft, an internally toothed gearwheel angularly coupled to said driven shaft, a toothed pinion on said auxiliary shaft, said gear wheel and said pinion being mounted in said stationary housing said pinion meshing with said internally toothed gearwheel.

5. Selective speed reduction gearing apparatus comprising a stationary housing, a spindle removably mounted in said stationary housing, a gear housing supported by said spindle in swingable and axially shiftable relation to said stationary housing, a drive shaft rotatably supported in said gear housing and axially located therein, a driven shaft and at least one auxiliary driven shaft each rotatably supported in said stationary housing, the said drive, driven and auxiliary driven shafts being supported in their respective housings with their axes at equal distances from and spaced along a circle about the axis of said spindle, whereby said drive shaft is enabled to be axially aligned with any of said driven and auxiliary driven shafts, axially engageable coupling means on each of said drive, driven and auxiliary driven shafts for alternative coupling of said drive shaft, by axial shifting thereof, with either of said driven or auxiliary driven shafts when aligned therewith, an electromotor mounted on said gear housing, reduction gear means between said electromotor and said drive shaft, an internally toothed gearwheel angularly coupled to said driven shaft, a toothed pinion on said auxiliary driven shaft, said gear wheel and said pinion being mounted in said stationary housing said pinion meshing with said internally toothed gearwheel.

References Cited in the file of this patent

UNITED STATES PATENTS

| 818,114 | Oster | Apr. 17, 1906 |

FOREIGN PATENTS

| 625,081 | Great Britain | June 21, 1949 |
| 749,721 | France | July 28, 1933 |